United States Patent
Furukawa et al.

(10) Patent No.: US 12,241,224 B2
(45) Date of Patent: Mar. 4, 2025

(54) POWER-OPERATED CONSTRUCTION MACHINE

(71) Applicant: Hitachi Construction Machinery Tierra Co., Ltd., Koka (JP)

(72) Inventors: Yuta Furukawa, Koka (JP); Seiichi Kihara, Koka (JP); Kiwamu Takahashi, Moriyama (JP)

(73) Assignee: Hitachi Construction Machinery Tierra Co., Ltd., Koka (JP)

( * ) Notice: Subject to any disclaimer, the term of this patent is extended or adjusted under 35 U.S.C. 154(b) by 425 days.

(21) Appl. No.: 17/639,826

(22) PCT Filed: Mar. 26, 2020

(86) PCT No.: PCT/JP2020/013763
§ 371 (c)(1),
(2) Date: Mar. 2, 2022

(87) PCT Pub. No.: WO2021/192165
PCT Pub. Date: Sep. 30, 2021

(65) Prior Publication Data
US 2022/0259818 A1 Aug. 18, 2022

(51) Int. Cl.
*E02F 9/08* (2006.01)
*E02F 3/32* (2006.01)
(Continued)

(52) U.S. Cl.
CPC ............ *E02F 9/0866* (2013.01); *E02F 3/325* (2013.01); *E02F 9/0883* (2013.01); *E02F 9/16* (2013.01); *E02F 9/22* (2013.01); *E02F 3/964* (2013.01)

(58) Field of Classification Search
CPC ....... E02F 9/0866; E02F 3/325; E02F 9/0883; E02F 9/16; E02F 9/22; E02F 3/964;
(Continued)

(56) References Cited

U.S. PATENT DOCUMENTS

2013/0071212 A1\* 3/2013 Yunoue ................. E02F 9/0883
414/685

FOREIGN PATENT DOCUMENTS

JP 2007-211613 A 8/2007
JP 2010121328 A \* 6/2010
(Continued)

OTHER PUBLICATIONS

JP 2019019792 A English Translation (Year: 2019).\*
(Continued)

*Primary Examiner* — James A Shriver, II
*Assistant Examiner* — Michael T. Walsh
(74) *Attorney, Agent, or Firm* — Crowell & Moring LLP (57) ABSTRACT

An upper revolving structure (4) of an electric hydraulic excavator (1) includes a revolving frame (7), an operator's seat (10), an electric motor (15), a hydraulic pump (17) driven by the electric motor (15), an oil tank (18), and an exterior cover (20) disposed in the revolving frame (7) to cover electrical equipment including the electric motor (15) and hydraulic equipment including the hydraulic pump (17) and the oil tank (18). A partitioning member (25) that is disposed in the revolving frame (7) to partition an inside of the exterior cover (20) into an electrical equipment room (28) and a hydraulic equipment room (29). An electrical equipment cooling device (31) including an electrical equipment cooling fan (34) is disposed in the electrical equipment room (28), and a hydraulic equipment cooling device (35) including a hydraulic equipment cooling fan (37) is disposed in the hydraulic equipment room (29).

6 Claims, 9 Drawing Sheets

(51) Int. Cl.
  *E02F 9/16* (2006.01)
  *E02F 9/22* (2006.01)
  *E02F 3/96* (2006.01)

(58) Field of Classification Search
  CPC ........ E02F 9/207; E02F 9/2091; B60K 11/06;
            B60K 1/04; B60K 2001/006; B60K
            2001/0416; B60Y 2200/41; B60Y
            2200/91; B60Y 2400/89
  See application file for complete search history.

(56) References Cited

FOREIGN PATENT DOCUMENTS

| JP | 2015140643 A | * | 8/2015 | | |
| JP | 2019019792 A | * | 2/2019 | | |
| WO | WO 2011/102042 A1 | | 8/2011 | | |
| WO | WO-2020059164 A1 | * | 3/2020 | ............... | B60K 1/04 |
| WO | WO-2020059165 A1 | * | 3/2020 | ............... | B60K 1/00 |

OTHER PUBLICATIONS

JP 2015140643 A English Translation (Year: 2015).*
WO 2020059164 A1 English Translation (Year: 2020).*
JP 2010121328 A English Translation (Year: 2010).*
WO 2020059165 A1 English Translation (Year: 2020).*
International Search Report (PCT/ISA/210) issued in PCT Application No. PCT/JP2020/013763 dated Jun. 23, 2020 with English translation (five (5) pages).
Japanese-language Written Opinion (PCT/ISA/237) issued in PCT Application No. PCT/JP2020/013763 dated Jun. 23, 2020 (three (3) pages).
C3 Chinese-language Office Action issued in Chinese Application No. 202080042338.7 dated Dec. 28, 2023 with English translation (11 pages).

* cited by examiner

POWER-OPERATED CONSTRUCTION MACHINE

TECHNICAL FIELD

The present invention relates to power-operated construction machines such as a hydraulic excavator provided with an electric motor as an electric power source.

BACKGROUND ART

In general, a hydraulic excavator as a representative example of construction machines is provided with an automotive lower traveling structure, an upper revolving structure mounted via a revolving device on the lower traveling structure to be capable of revolving thereto, and a working mechanism mounted on the front side of the upper revolving structure. In recent years, power-operated hydraulic excavators have been put to practical use to be provided with an electric motor as an electric power source for the purpose of suppressing global warming and air pollution. This power-operated hydraulic excavator is provided with electrically powered equipment and hydraulic equipment thereupon.

The electrically powered equipment mounted on the power-operated hydraulic excavator is configured of the electric motor acting as the electric power source, a battery that feeds power to the electric motor, an inverter that controls an operation of the electric motor, and the like. The hydraulic equipment mounted on the power-operated hydraulic excavator is configured of a hydraulic pump that is driven by the electric motor to deliver hydraulic oil for operations to various kinds of hydraulic actuators, an oil tank that reserves therein operating oil to be suctioned to the hydraulic pump, and the like. The electrically powered equipment and the hydraulic equipment generate heat at the operating thereof. Therefore, the power-operated hydraulic excavator is provided with a cooling device including a heat exchanger and a cooling fan mounted thereon, wherein the electrically powered equipment and the hydraulic equipment are cooled by the cooling device.

Such a power-operated hydraulic excavator is proposed to be configured in such a way that an operator's seat is disposed in the left side of the upper revolving structure, and electrical equipment excluding a battery, the hydraulic equipment, the heat exchanger and the like are disposed in the right side of the upper revolving structure, the battery being disposed in the rear side of the upper revolving structure. In the power-operated hydraulic excavator according to this conventional technology, a partition plate is provided in the upper revolving structure, and a machine room in which the electrical equipment and the hydraulic equipment are accommodated and a battery room in which the battery is accommodated are partitioned by this partition plate. The cooling fan is disposed in the machine room, and the electrical equipment and the hydraulic equipment are cooled by cooling wind caused by this cooling fan. This structure can prevent the heat generated in the electrical equipment and the hydraulic equipment from being transmitted to the battery and keep an appropriate temperature in the surroundings of the battery (refer to Patent Document 1).

PRIOR ART DOCUMENT

Patent Document

Patent Document 1: International Publication No. WO 2011/102042

SUMMARY OF THE INVENTION

In the power-operated hydraulic excavator according to the conventional technology, the electrical equipment and the hydraulic equipment are accommodated in the same space (the machine room) and are together cooled by the cooling wind supplied into the machine room. However, a temperature (a use temperature band) when the electrical equipment such as the electric motor and the inverter is used is different from a use temperature band when the hydraulic equipment such as the hydraulic pump and the oil tank is used. Therefore, it is difficult to efficiently cool the electrical equipment and the hydraulic equipment at the same time in the structure where the electrical equipment and the hydraulic equipment are cooled together by the cooling wind supplied into the machine room.

An object of the present invention is to provide a power-operated construction machine that enables electrical equipment and hydraulic equipment each mounted on a vehicle body to be efficiently cooled.

An aspect of the present invention is applied to a power-operated construction machine comprising:
an automotive vehicle body; and
a working mechanism that is disposed in the vehicle body, wherein the vehicle body includes:
a vehicle body frame to the front side of which the working mechanism is attached;
an operator's seat that is disposed on the vehicle body frame;
an electric motor that is disposed on the vehicle body frame to be separated to one side of the vehicle body in a left-right direction from the operator's seat and is operated by power-feeding from an electric source;
a hydraulic pump that is driven by the electric motor to deliver operating oil to the working mechanism;
an oil tank that reserves therein the operating oil to be delivered to the working mechanism; and
an exterior cover that is disposed on the vehicle body frame to cover electrical equipment including the electric motor and hydraulic equipment including the hydraulic pump and the oil tank, characterized in that:
the vehicle body frame is provided with a partition member that partitions an inside of the exterior cover into an electrical equipment room in which the electrical equipment is accommodated and a hydraulic equipment room in which the hydraulic equipment is accommodated;
the electrical equipment room is provided therein with an electrical equipment cooling device that includes an electrical equipment cooling fan to cool the electrical equipment; and
the hydraulic equipment room is provided therein with a hydraulic equipment cooling device that includes a hydraulic equipment cooling fan to cool the hydraulic equipment.

According to the aspect of the present invention, the electrical equipment accommodated in the electrical equipment room is cooled by the electrical equipment cooling device and the hydraulic equipment accommodated in the hydraulic equipment room is cooled by the hydraulic equipment cooling device. Accordingly, the electrical equipment and the hydraulic equipment can respectively be cooled by the individual cooling devices, and the electrical equipment and the hydraulic equipment each can efficiently be cooled.

MODE FOR CARRYING OUT THE INVENTION

Hereinafter, a power-operated construction machine according to an embodiment of the present invention will be in detail explained referring to FIG. 1 to FIG. 9 by taking a power-operated hydraulic excavator provided with a crawler as an example. It should be noted that the embodiment will be explained by defining a traveling direction of the hydraulic excavator as a front-back direction and a direction perpendicular to the traveling direction of the hydraulic excavator as a left-right direction.

Figure 1:
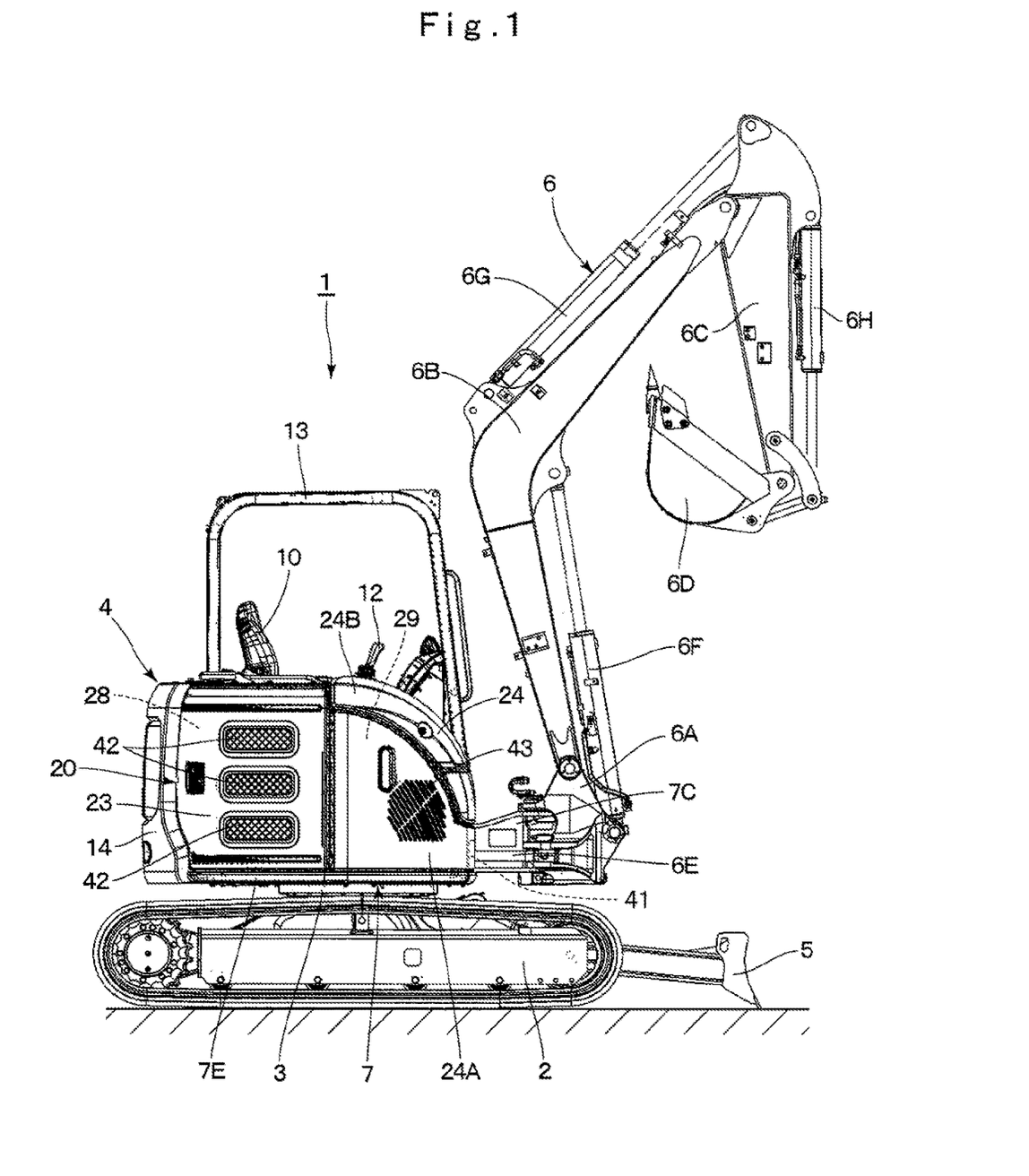
FIG. 1 is a right side view showing a power-operated hydraulic excavator according to an embodiment of the present invention.
Figure 2:
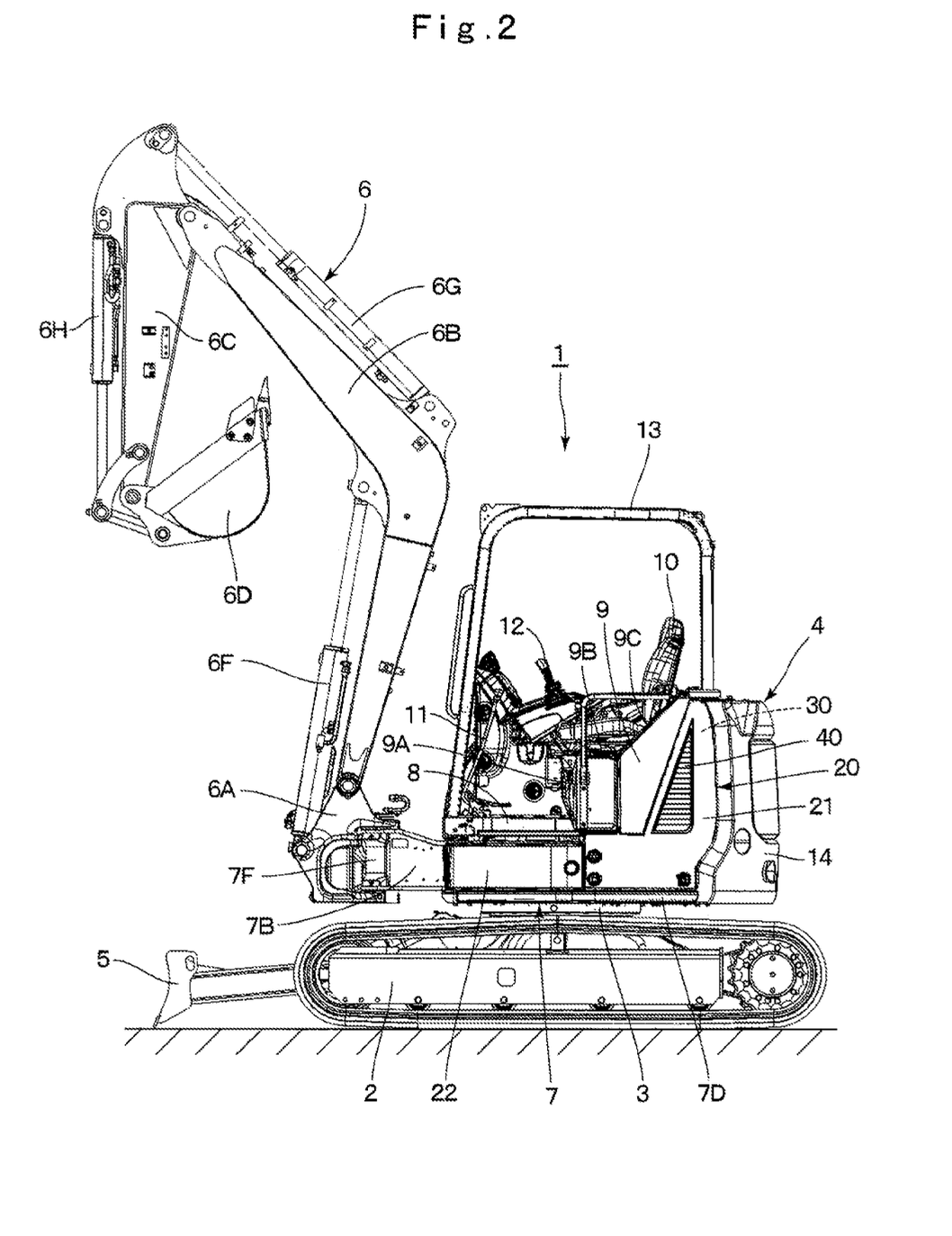
FIG. 2 is a left side view showing the power-operated hydraulic excavator.

In FIG. 1 and FIG. 2, a power-operated hydraulic excavator 1 as a representative example of a power-operated construction machine is provided with a crawler type of an automotive lower traveling structure 2 in the front-back direction and an upper revolving structure 4 that is mounted via a revolving device 3 on the lower traveling structure 2 to be capable of revolving thereto. A vehicle body of the power-operated hydraulic excavator 1 is configured of the lower traveling structure 2 and the upper revolving structure 4. A blade (soil removal board) 5 is disposed in the front side of the lower traveling structure 2 to be capable of rotating in the upper-lower direction, and this blade 5 is used to perform a soil removal work and the like. A swing type working mechanism 6 is disposed in the front side of the upper revolving structure 4, and this working mechanism 6 is used to perform an excavating work of sand and earth, and the like.

The swing type working mechanism 6 is configured of a swing post 6A that is disposed in the front side of a revolving frame 7 to be capable of swinging thereto in the left-right direction, a boom 6B attached on the swing post 6A to be rotatable to the swing post 6A, an arm 6C attached on a tip end of the boom 6B to be rotatable thereto, and a bucket 6D attached on a tip end of the arm 6C to be rotatable thereto in the upper-lower direction, which will be described later. In addition, the working mechanism 6 is provided with a swing cylinder 6E that swings the swing post 6A, a boom cylinder 6F that rotates the boom 6B, an arm cylinder 6G that rotates the arm 6C, and a bucket cylinder 6H that rotates the bucket 6D.

The upper revolving structure 4 is mounted via the revolving device 3 on the lower traveling structure 2 to be capable of revolving thereto and performs a revolving operation on the lower traveling structure 2. The upper revolving structure 4 is configured of a revolving frame 7, an operator's seat 10, a canopy 13, a counterweight 14, an electric motor 15, a hydraulic pump 17, a battery 19, and an exterior cover 20, which will be described later.

The revolving frame 7 as a vehicle body frame configures a base of the upper revolving structure 4. The revolving frame 7 is mounted via the revolving device 3 on the lower traveling structure 2, and the working mechanism 6 is attached on the front side of the revolving frame 7.

Figure 4:
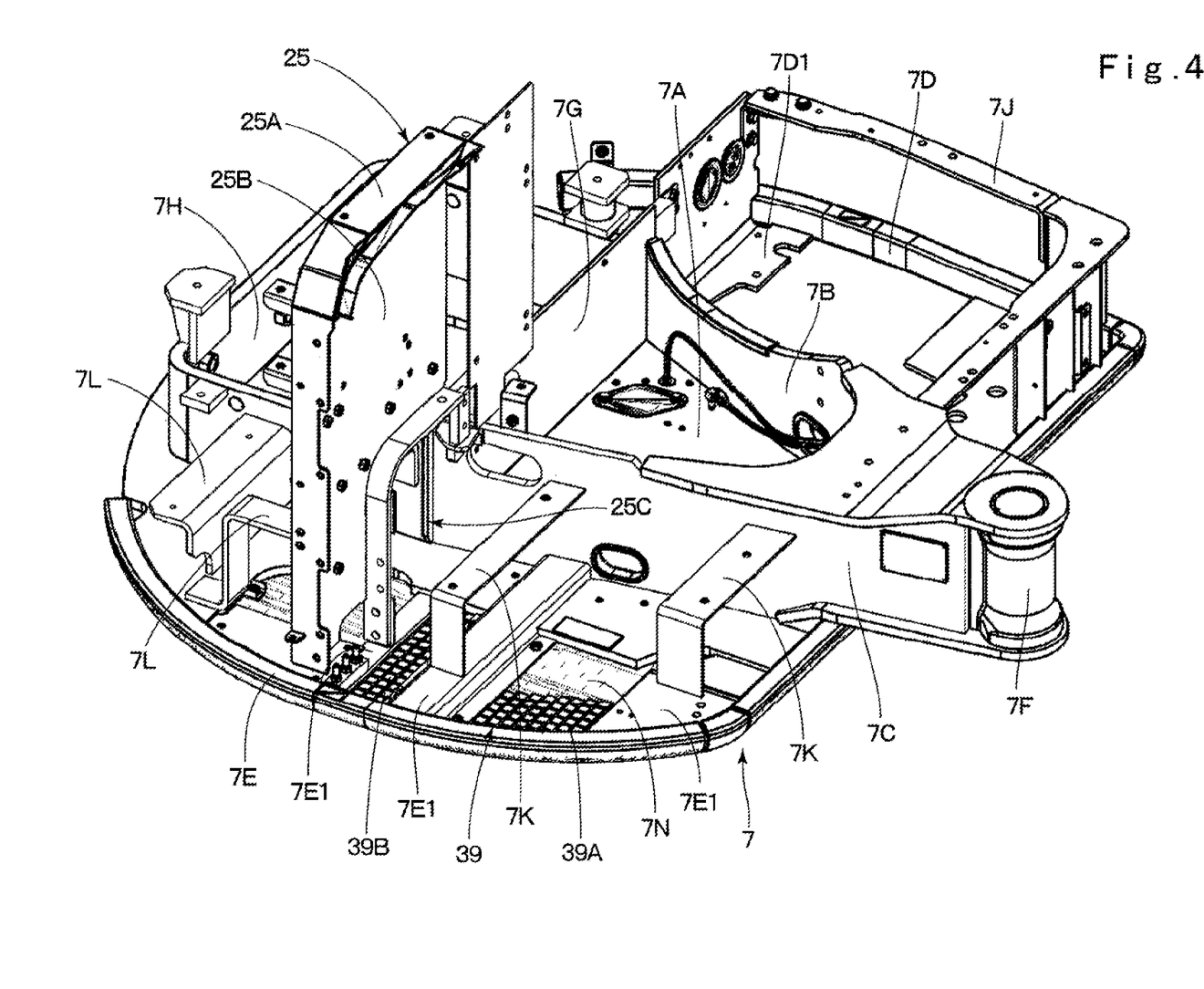
FIG. 4 is a perspective view showing a state where a partition member is attached to a revolving frame.
Figure 5:
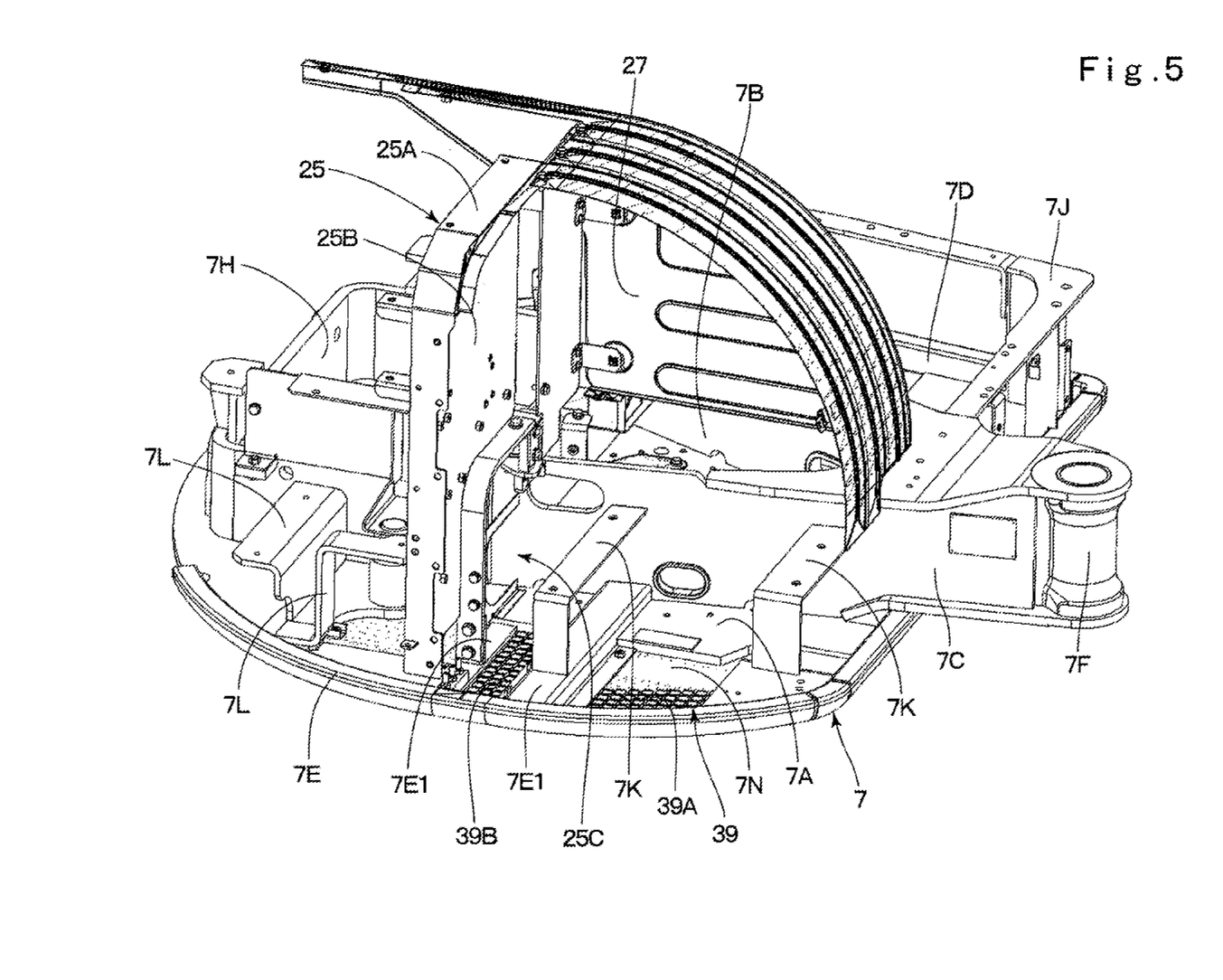
FIG. 5 is a perspective view showing a state where the partition member and a dividing wall are attached to the revolving frame.
Figure 6:
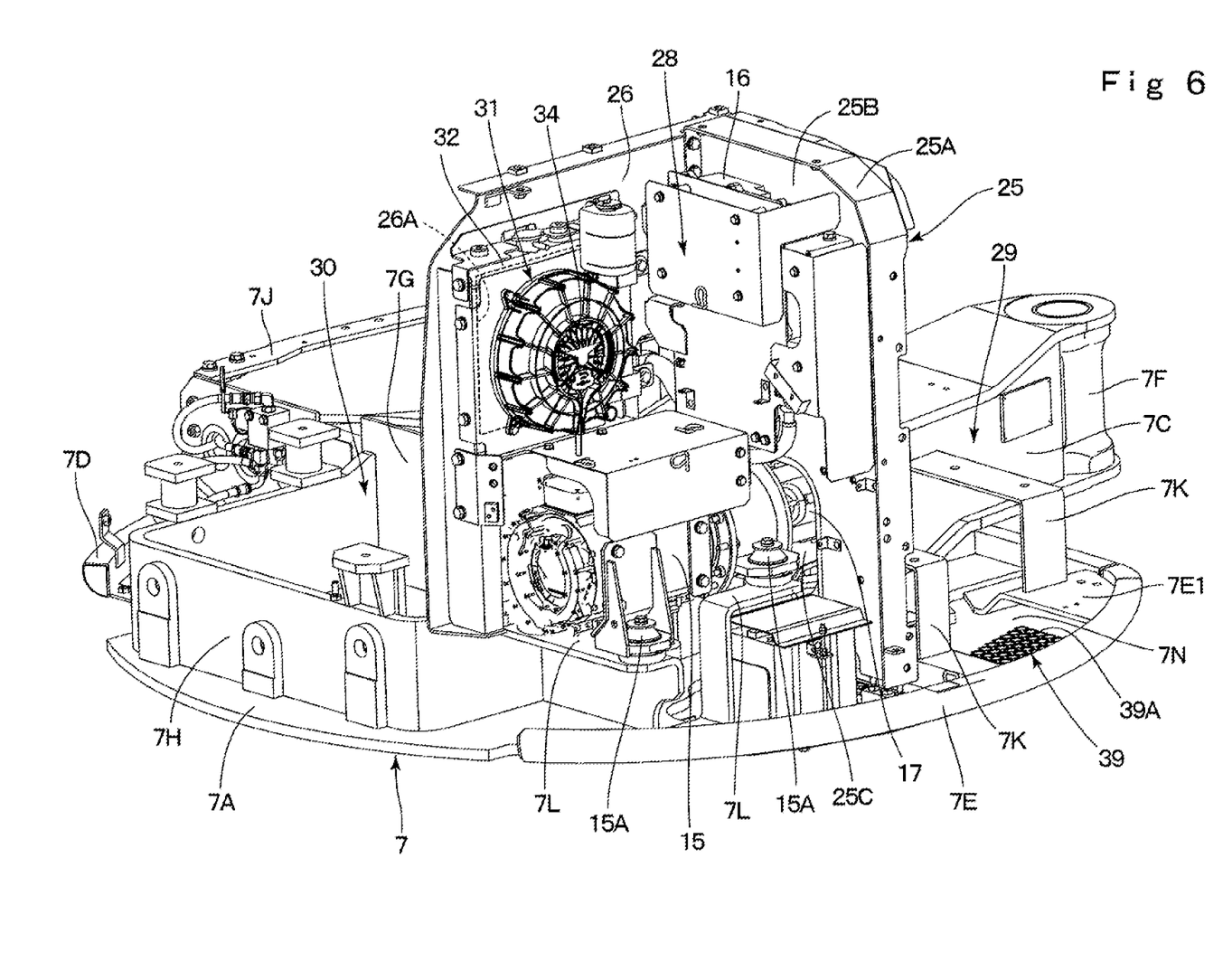
FIG. 6 is a perspective view showing a state where the partition member, a second partition member, an electric motor, a radiator, an inverter, an electrical equipment cooling fan and the like are attached to the revolving frame.

As shown in FIG. 4 to FIG. 6, the revolving frame 7 is configured of a bottom plate 7A, a left vertical plate 7B and a right vertical plate 7C, a left side frame 7D, and a right side frame 7E. The bottom plate 7A is formed of a thick steel plate extending in the front-back direction and is positioned in the central part in the left-right direction to extend in the front-back direction. The left vertical plate 7B and the right vertical plate 7C are disposed upward on the bottom plate 7A and extend in the front-back direction to face with each other in the left-right direction. The left side frame 7D is fixed to a tip end of a left extension beam 7D1 extending to a left lateral side from the bottom plate 7A and the left vertical plate 7B, and extends in the front-back direction. The right side frame 7E is fixed to a tip end of a right extension beam 7E1 extending to a right lateral side from the bottom plate 7A and the right vertical plate 7C, and extends in the front-back direction, and extends in the front-back direction to bend in an arc shape.

An interval between the left vertical plate 7B and the right vertical plate 7C is made smaller toward the front side from the rear side, and a cylindrical support body 7F is disposed on front ends of the left vertical plate 7B and the right vertical plate 7C. The swing post 6A of the working mechanism 6 is supported on the cylindrical support body 7F to be capable of swinging in the left-right direction. A lateral plate 7G extending in the left-right direction is disposed in the intermediate part of the revolving frame 7 in the front-back direction. The lateral plate 7G is disposed upward on the bottom plate 7A, and establishes connection between a rear end of the left vertical plate 7B and a rear end of the right vertical plate 7C. A battery attaching frame 7H is disposed in the rear side of the revolving frame 7 to attach the battery 19. The battery attaching frame 7H is formed as a frame body bent in a C-letter shape, and is positioned in the rear side of the lateral plate 7G to be disposed upward on the bottom plate 7A.

A floor support member 7J bent in an L-letter shape is disposed on the left side of the left vertical plate 7B. The floor support member 7J is disposed at a constant interval on the left side frame 7D, and supports an after-mentioned floor member 8. A pair of tank support members 7K are disposed at an interval in the front-back direction between the right vertical plate 7C and the right extension beam 7E1. The pair of tank support members 7K extend to a right lateral side from the right vertical plate 7C toward the right side frame 7E. The swing cylinder 6E is disposed on the lower side of the tank support member 7K, and an after-mentioned oil tank 18 is supported on the upper side of the tank support member 7K. A pair of motor support members 7L are disposed at an interval in the front-back direction on the right side of the battery attaching frame 7H. The motor support members 7L support the electric motor 15.

Figure 3:
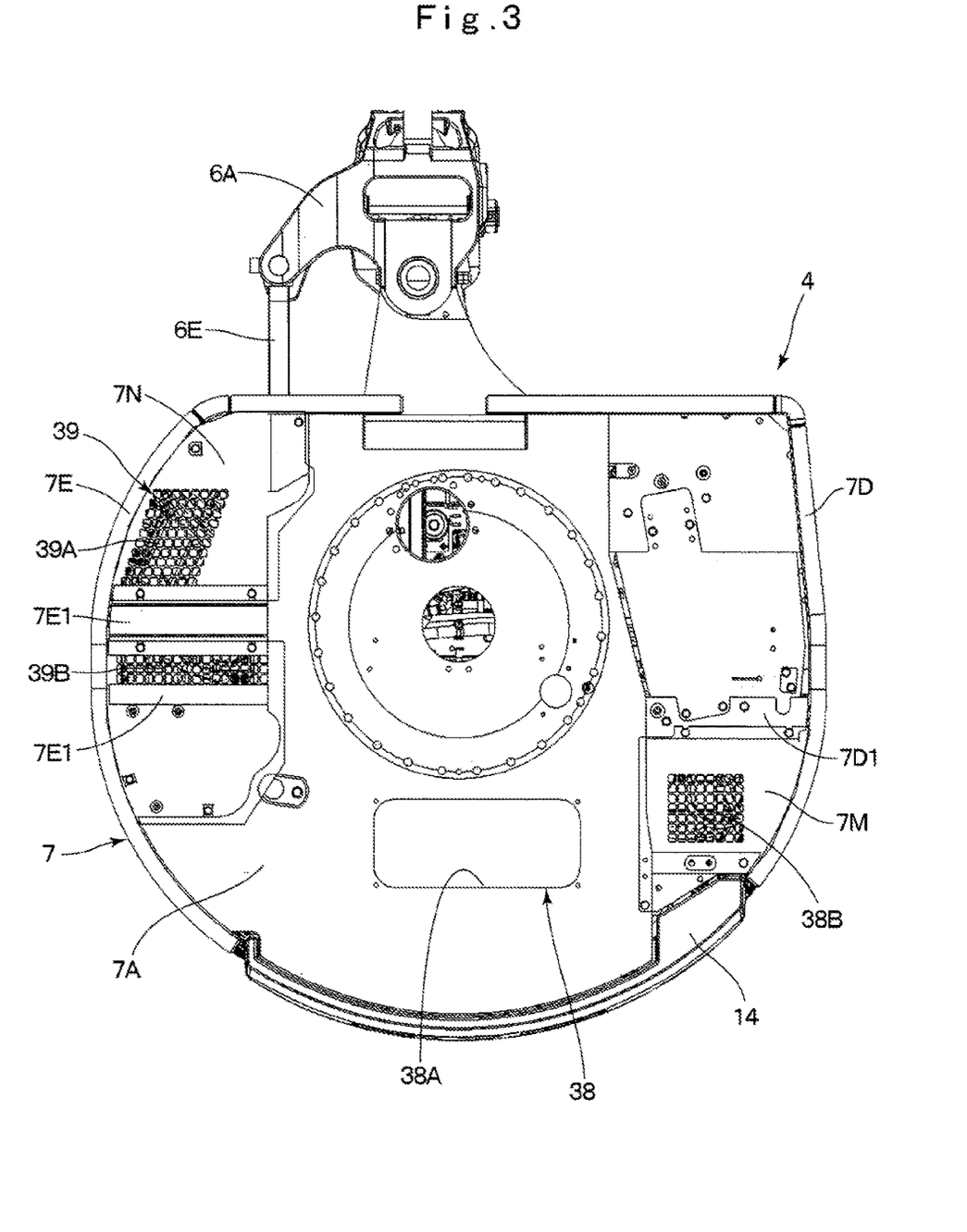
FIG. 3 is a bottom view showing an upper revolving structure, as viewed from downward.

As shown in FIG. 3, a left under cover 7M is disposed between the bottom plate 7A of the revolving frame 7 and the left side frame 7D. A right under cover 7N is disposed between the bottom plate 7A of the revolving frame 7 and the right side frame 7E. A central inlet port 38A of a frame-side cooling wind inlet port 38 for electrical equipment room is formed in the rear side of the bottom plate 7A, which will be described later. A left inlet port 38B, which will be described later, is disposed in a left under cover 7M, and a front inlet port 39A and a rear inlet port 39B of a frame-side cooling inlet port 39 for hydraulic equipment room, which will be described later, are arranged in the right under cover 7N.

The floor member 8 is attached on the floor support member 7J of the revolving frame 7, and is disposed in a left front side of the revolving frame 7. The floor member 8 is disposed to horizontally extend in a range from a left front part of the revolving frame 7 to a central part thereof in the front-back direction to form a foothold of an operator sitting on the operator's seat 10. An operator's seat base 9 is positioned in the rear side of the floor member 8 to be disposed in the left side to the revolving frame 7. The operator's seat base 9 is configured of a raising portion 9A raising upward from a rear end of the floor member 8, a horizontal base portion 9B extending backward from an upper end of the raising portion 9A, and a back plate portion 9C extending obliquely upward from a rear end of the base portion 9B.

The operator's seat 10 is attached on the operator's seat base 9 disposed on the revolving frame 7. The operator's seat 10 is a seat for an operator to sit on. Left and right lever/pedals 11 for traveling (one in the left side only is shown) are arranged in front of the operator's seat 10 to control a traveling direction of the lower traveling structure 2. Left and right control levers 12 for working are arranged in both of the left side and the right side of the operator's seat 10 to control the revolving device 3 and the working mechanism 6. The upper side of the floor member 8 and the operator's seat 10 is covered with the canopy 13 of a four-column type.

The counterweight 14 is positioned in back of the operator's seat 10 to be disposed in a rear end of the revolving frame 7 and acts as a weight balance to the working mechanism 6. An outer peripheral surface of the counterweight 14 is formed in an arc shape such that a central part thereof in the left-right direction projects backward. Thereby, at the revolving of the upper revolving structure 4, the outer peripheral surface of the counterweight 14 is configured to be accommodated within a constant revolving radius. The counterweight 14 covers the battery 19 from behind.

The electric motor 15 is disposed in the revolving frame 7 to be separated in the right side (one side of the upper revolving structure 4 in the left-right direction) from the operator's seat 10. The electric motor 15 configures the electric power source of the power-operated hydraulic excavator 1, and operates by power-feeding from the battery 19 to drive the hydraulic pump 17. The electric motor 15 is accommodated within the after-mentioned electrical equipment room 28, and is supported via a mount member 15A on the motor support member 7L of the revolving frame 7 in a state where an output shaft (not shown) thereof extends in the front-back direction.

The inverter 16 is positioned on the upper side to the electric motor 15 to be attached on an after-mentioned partition member 25. The inverter 16 controls a drive voltage to be fed to the electric motor 15 from the battery 19, thereby controlling an operation of the electric motor 15. The inverter 16 and the electric motor 15 configure electrical equipment and are accommodated within the after-mentioned electrical equipment room 28. Here, the electric motor 15 and the inverter 16 are respectively provided with water jackets (none of them is shown) in which cooling water circulates, and an after-mentioned cooling water pump 33 is connected to the water jackets.

The hydraulic pump 17 is attached on the front side to the electric motor 15. The hydraulic pump 17 is driven by the electric motor 15 to pressurize the operating oil reserved in the oil tank 18. Thereby, the hydraulic pump 17 delivers the operating oil as pressurized oil for operations to various kinds of actuators of the swing cylinder 6E, the boom cylinder 6F, the arm cylinder 6G, the bucket cylinder 6H and the like.

Figure 7:
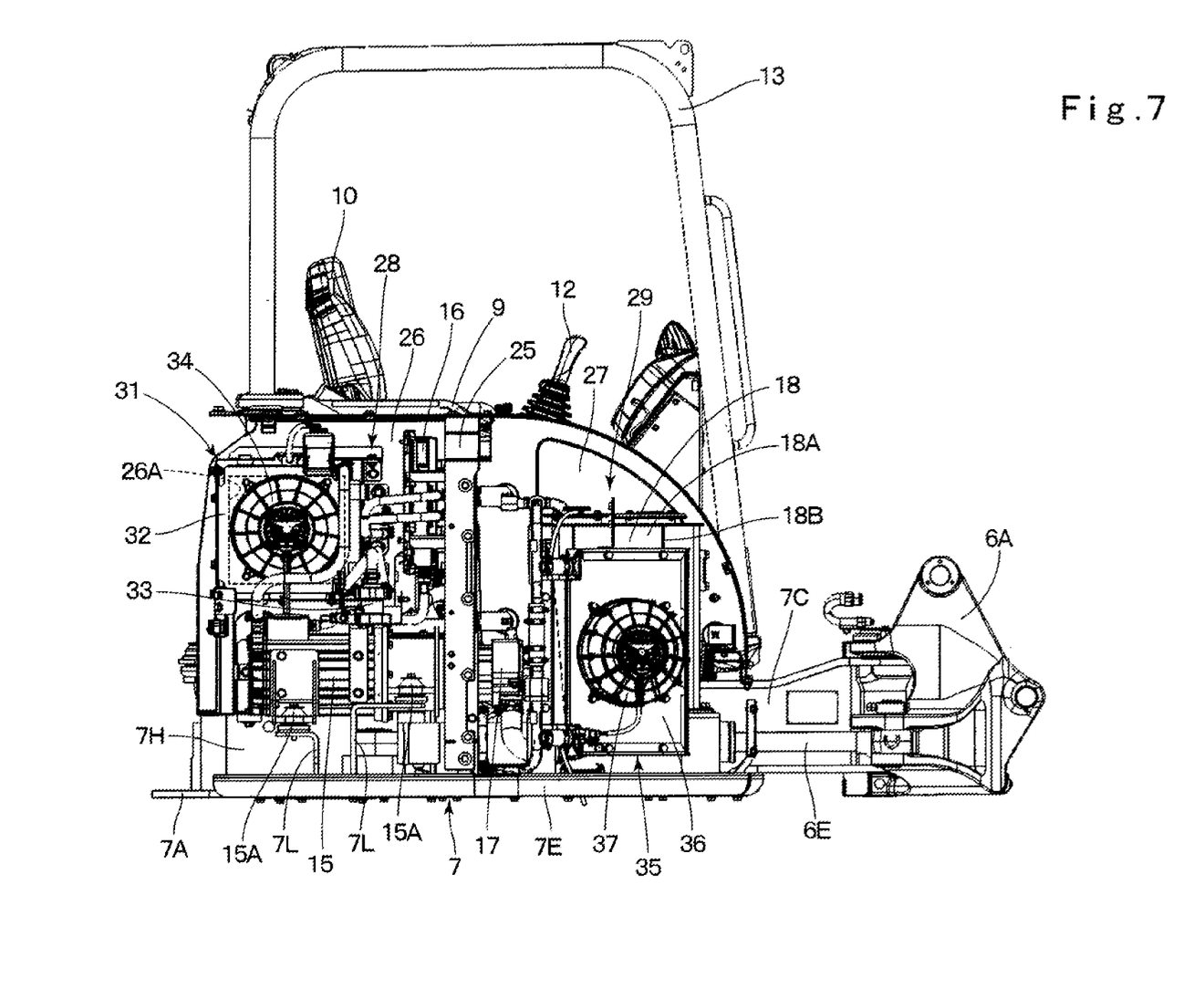
FIG. 7 is a right side view showing the upper revolving structure with a working mechanism, a counterweight, a right rear exterior cover, a right front exterior cover and the like being removed.
Figure 8:
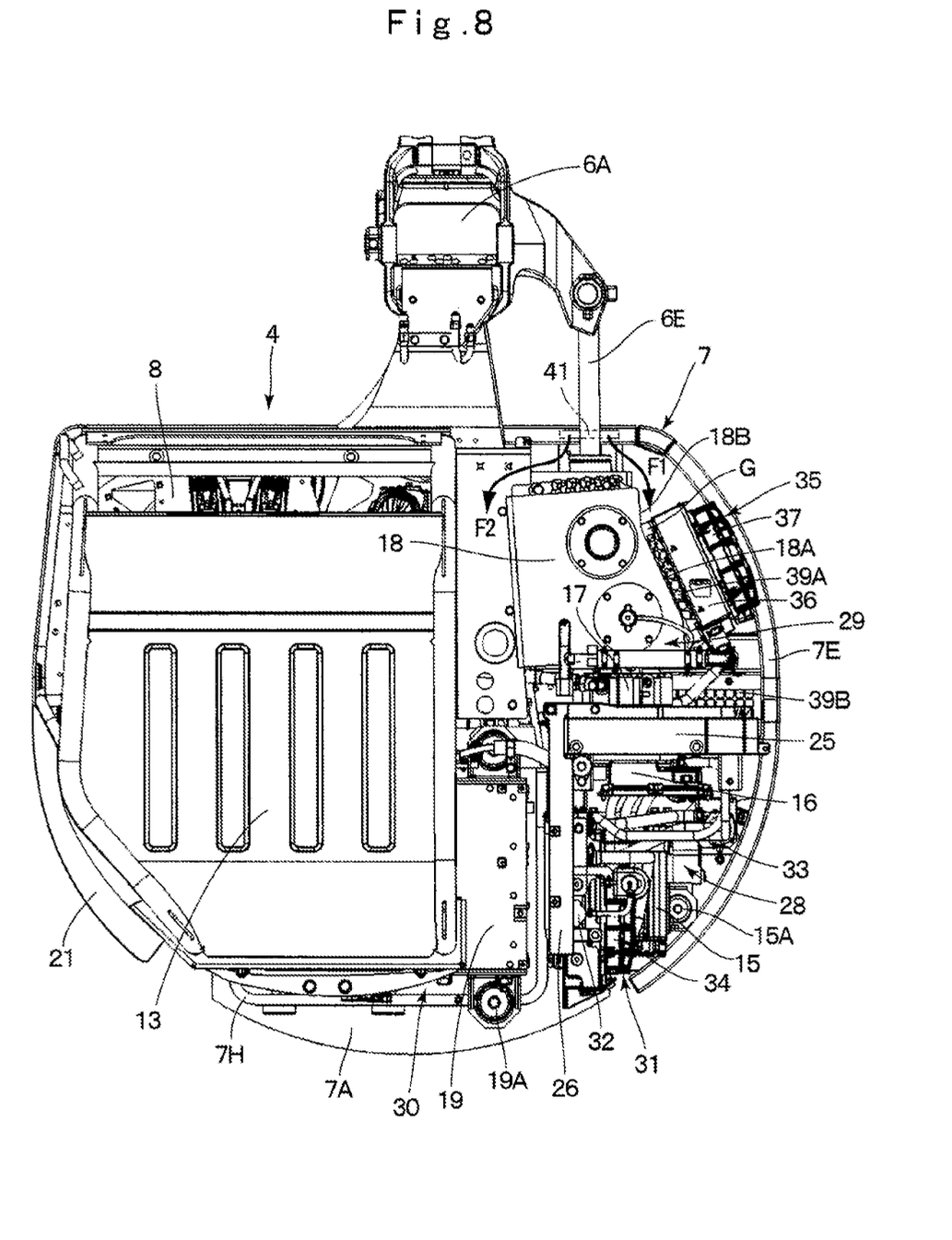
FIG. 8 is a plan view showing the upper revolving structure with the working mechanism, the counterweight, the right rear exterior cover, the right front exterior cover, the dividing wall and the like being removed.
Figure 9:
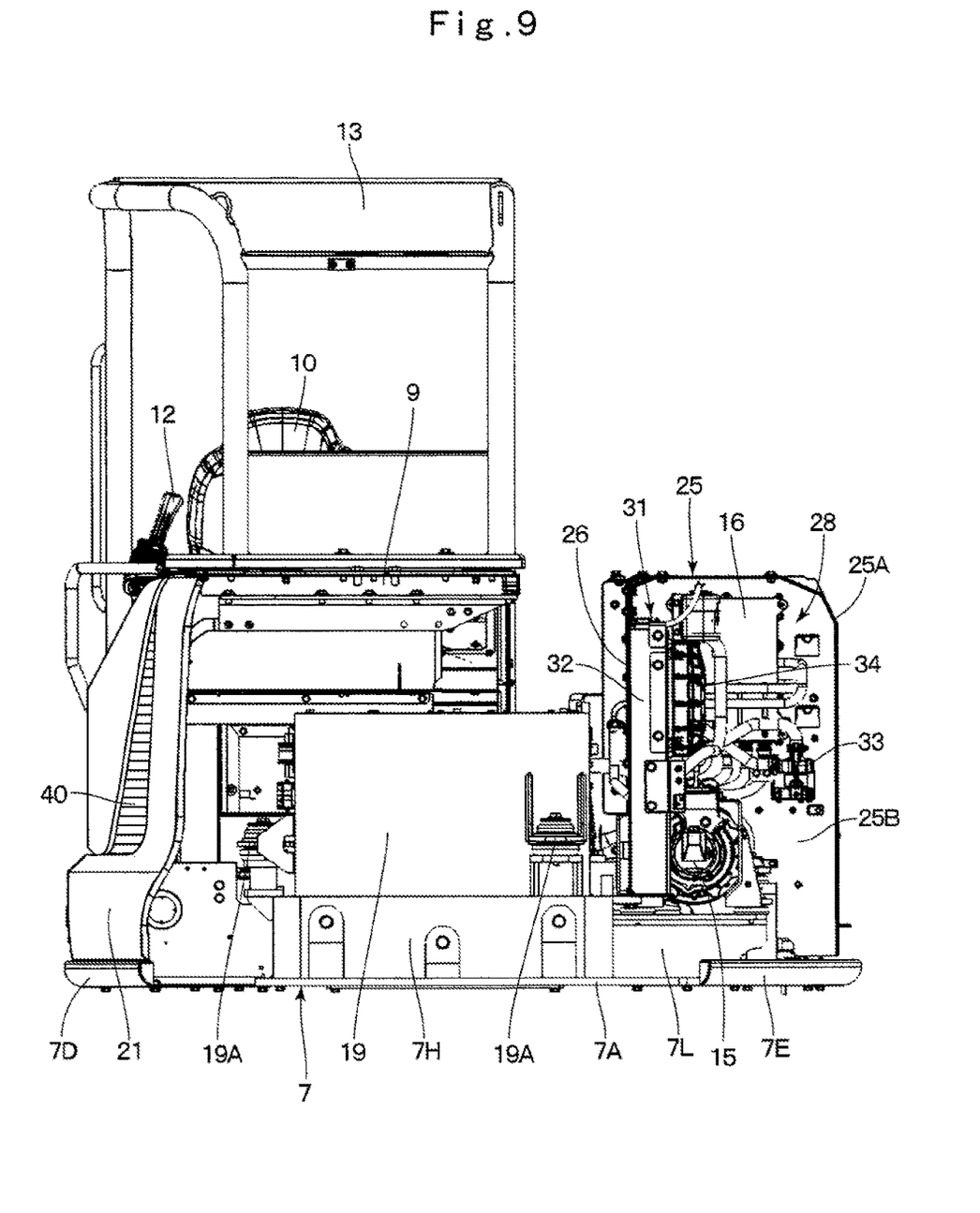
FIG. 9 is a rear view showing the upper revolving structure with the working mechanism, the counterweight, the right rear exterior cover, the right front exterior cover, the dividing wall and the like being removed.

The oil tank 18 is positioned in front of the hydraulic pump 17 to be disposed in a right front side of the revolving frame 7. The oil tank 18 is, as shown in FIG. 7 and FIG. 8, formed as a reservoir in a box type extending in the upper-lower direction and is supported on the tank support member 7K of the revolving frame 7. The operating oil to be delivered to the various kinds of hydraulic actuators is reserved in the oil tank 18. A concave recess portion 18B is formed on an outer side surface 18A, which faces an after-mentioned right front exterior cover 24 in the left-right direction, of the oil tank 18 to be recessed in a direction away from the right front exterior cover 24. The hydraulic pump 17 and the oil tank 18 configure hydraulic equipment and are accommodated in an after-mentioned hydraulic equipment room 29.

The battery 19 is positioned in back of the operator's seat 10 to be mounted on the revolving frame 7. The battery 19 configures an electric source and feeds electric power to the electric motor 15. The battery 19 is disposed between the operator's seat base 9 and the counterweight 14, and is attached via a mount member 19A on the battery attaching frame 7H of the revolving frame 7. The battery 19 is accommodated in an after-mentioned battery room 30.

The exterior cover 20 is disposed on the revolving frame 7 to surround the periphery of the operator's seat 10. The exterior cover 20 covers the electrical equipment including the electric motor 15, the inverter 16 and the like, the hydraulic equipment including the hydraulic pump 17, the oil tank 18 and the like, the battery 19, and the like together with the counterweight 14. The exterior cover 20 is configured of a left rear exterior cover 21 and a left front exterior cover 22, which are shown in FIG. 2, and a right rear exterior cover 23 and a right front exterior cover 24, which are shown in FIG. 1.

The left rear exterior cover 21 is disposed in a range from a left end of the counterweight 14 to the left side of the operator's seat 10. The left rear exterior cover 21 covers the battery 19 and the like from a left lateral side. The left front exterior cover 22 is disposed in a range from a front end of the left rear exterior cover 21 to the left vertical plate 7B of the revolving frame 7. The left front exterior cover 22 covers, for example, a control valve and the like (not shown) arranged between the floor member 8 and the left side frame 7D of the revolving frame 7 from the left lateral side and the front side.

The right rear exterior cover 23 is disposed in a range from a right end of the counterweight 14 to the right side of the operator's seat 10. The right rear exterior cover 23 covers the electrical equipment of the electric motor 15, the inverter 16 and the like from a right lateral side. The right front exterior cover 24 is disposed in a range from a front end of the right rear exterior cover 23 to the right vertical plate 7C of the revolving frame 7. The right front exterior cover 24 is configured of a right front under cover 24A and a right front upper cover 24B disposed on the right front under cover 24A to be capable of opening/closing in the upper-lower direction. The right front under cover 24A covers the hydraulic equipment including the hydraulic pump 17, the oil tank 18 and the like from the right lateral side and the front side. The right front upper cover 24B covers the hydraulic equipment including the hydraulic pump 17, the oil tank 18 and the like from the upper side and the front side.

A partition member 25 is positioned in the right side to the operator's seat 10 to be disposed on the revolving frame 7. The partition member 25 partitions the inside of the exterior cover into the electrical equipment room 28 and the hydraulic equipment room 29. The partition member 25 is disposed in the intermediate part of the revolving frame 7 in the front-back direction, and bridges from a right portion of the lateral plate 7G to the right vertical plate 7C and extends in the left-right direction to the right side frame 7E. Here, the partition member 25 is configured of a frame body 25A in an L-letter shape disposed upward between the right vertical plate 7C and the right side frame 7E and a plate body 25B attached on the inside of the frame body 25A. The frame body 25A of the partition member 25 supports the front end of the right rear exterior cover 23 via a hinge mechanism (not shown) to be capable of opening/closing. A pump insert portion 25C is formed in a portion, which corresponds to a corner part in which the bottom plate 7A and the right vertical plate 7C of the revolving frame 7 intersect, of the plate body 25B in the partition member 25, penetrating the portion in the front-back direction. The hydraulic pump 17 connected to the front side of the electric motor 15 is inserted in the pump insert portion 25C.

A second partition member 26 is positioned in back of the partition member 25 to be disposed on the revolving frame 7. As shown in FIG. 6 and FIG. 7, the second partition member 26 is formed of a plate body extending in the upper-lower direction and in the front-back direction and partitions between the battery room 30 and the electrical equipment room 28. The second partition member 26 is disposed in the right side of the battery 19 and extends backward from the partition member 25 toward the counterweight 14. The second partition member 26 shields heat from the electric motor 15, the inverter 16 and the like accommodated in the electrical equipment room 28 to the battery 19 accommodated in the battery room 30.

A communication port 26A in a square hole shape is formed on an upper portion of the second partition member 26. The communication port 26A makes communication between the battery room 30 and the electrical equipment room 28 and causes cooling wind introduced into the battery room 30 to flow into the electrical equipment room 28.

A dividing wall 27 is positioned in the front side of the partition member 25 to be disposed on the revolving frame 7. As shown in FIG. 5 and FIG. 7, the dividing wall 27 is formed of a plate body extending in the upper-lower direction and in the front-back direction to be disposed in the right side to the operator's seat 10. The dividing wall 27 extends forward from the left side of the partition member 25 and partitions between the operator's seat 10 and the hydraulic equipment room 29.

The electrical equipment room 28 is positioned in back of the partition member 25 and in the right side to the second partition member 26 to be formed within the exterior cover 20. That is, the electrical equipment room 28 is formed as a space surrounded by the partition member 25, the second partition member 26 and the right rear exterior cover 23, and is disposed in a right rear side of the upper revolving structure 4. The electrical equipment of the electric motor 15, the inverter 16 and the like, and an after-mentioned electrical equipment cooling device 31 are accommodated in the electrical equipment room 28.

The hydraulic equipment room 29 is positioned in front of the partition member 25 and in the right side to the dividing wall 27 to be formed within the exterior cover 20. That is, the hydraulic equipment room 29 and the electrical equipment room 28 are partitioned as two spaces by the partition member 25 to be independent from each other. The hydraulic equipment room 29 is formed as the space surrounded by the partition member 25, the dividing wall 27 and the right front exterior cover 24, and is disposed in a right front side of the upper revolving structure 4. The hydraulic equipment of the hydraulic pump 17, the oil tank 18 and the like, and an after-mentioned hydraulic equipment cooling device 35 are accommodated in the hydraulic equipment room 29.

The battery room 30 is positioned in the left side to the second partition member 26 and in back of the partition member 25 to be formed within the exterior cover 20. That is, the second partition member 26 is disposed between the battery room 30 and the electrical equipment room 28, and the battery room 30 is formed as a space independent from the electrical equipment room 28 and the hydraulic equipment room 29. The battery room 30 is formed as the space surrounded by the operator's seat base 9, the counterweight 14, the left rear exterior cover 21 and the second partition member 26, and is disposed in a central rear side of the upper revolving structure 4. The battery 19 as the electric source is accommodated within the battery room 30.

The electrical equipment cooling device 31 is disposed together with the electric motor 15 and the inverter 16 within the electrical equipment room 28. The electrical equipment cooling device 31 is configured of a radiator 32, a cooling water pump 33 and the electrical equipment cooling fan 34. The radiator 32 is disposed in a position corresponding to the communication port 26A of the second partition member 26. That is, the radiator 32 is disposed in such a manner as to cover the communication port 26A, causing cooling wind flowing through the communication port 26A from the battery room 30 into the electrical equipment room 28 to be directly supplied thereto (pass therethrough). The radiator 32 releases the heat of the cooling water, which circulates in the water jackets (none of them is shown) of the electric motor 15 and the inverter 16 by the cooling water pump 33, by the cooling wind flowing into the electrical equipment room 28 to cool the electric motor 15 and the inverter 16.

The cooling water pump 33 is supported via a bracket and the like (not shown) on the partition member 25 and is disposed closer to the upper side than the electric motor 15 and closer to the lower side than the electrical equipment cooling fan 34. The cooling water pump 33 is connected to the water jackets (none of them is shown) in the electric motor 15 and the inverter 16, causing the cooling water to be circulated in the water jackets. The electrical equipment cooling fan 34 is attached on a face, which is at the opposite side to the second partition member 26, of the radiator 32. The electrical equipment cooling fan 34 is composed of, for example, an electric fan and introduces the cooling wind through the communication port 26A of the second partition member 26 into the electrical equipment room 28.

Here, as shown in FIG. 7, the electric motor 15, the inverter 16 and the cooling water pump 33 are arranged within a region out of (not facing) a region facing the electrical equipment cooling fan 34 inside of the electrical equipment room 28. Thereby, the cooling wind having flowed into the electrical equipment room 28 by the electrical equipment cooling fan 34 does not collide directly with the electric motor 15, the inverter 16 and the cooling water pump 33. As a result, the cooling wind having flowed into the electrical equipment room 28 flows smoothly toward an after-mentioned cooling wind outlet port 42 for electrical equipment room.

The hydraulic equipment cooling device 35 is disposed together with the hydraulic pump 17 and the oil tank 18 within the hydraulic equipment room 29. The hydraulic equipment cooling device 35 is configured of an oil cooler 36 and a hydraulic equipment cooling fan 37. The oil cooler 36 faces a portion, which corresponds to the concave recess portion 18B, of the outer side surface 18A of the oil tank 18 with a gap G therebetween, and faces the right front under cover 24A of the right front exterior cover 24 in the left-right direction (refer to FIG. 8). The oil cooler 36 releases heat of return oil (operating oil), which returns to the oil tank 18 from hydraulic actuators, into the cooling wind by the hydraulic equipment cooling fan 37 to cool the operating oil.

The hydraulic equipment cooling fan 37 is attached at the opposite side to the oil tank 18 across the oil cooler 36 and is disposed between the oil cooler 36 and the right front exterior cover 24 (the right front under cover 24A). The hydraulic equipment cooling fan 37 is composed of, for example, an electric fan and introduces the cooling wind through a frame-side cooling wind inlet port 39 for hydraulic equipment room and a cover-side cooling wind inlet port 41 for hydraulic equipment room, which will be described later, into the hydraulic equipment room 29. In this way, the oil cooler 36 is disposed to face the outer side surface 18A of the oil tank 18 with a gap G therebetween, and the hydraulic equipment cooling fan 37 is attached at the opposite side to the oil tank 18 across the oil cooler 36. As a result, part of the cooling wind introduced into the hydraulic equipment room 29 by the hydraulic equipment cooling fan 37 flows along the outer side surface 18A of the oil tank 18, and is discharged to outside through a cooling wind outlet port 43 for hydraulic equipment room, which will be described later.

The frame-side cooling wind inlet port 38 for electric equipment device room is disposed in the revolving frame 7 and opens to the battery room 30. As shown in FIG. 3, the frame-side cooling wind inlet port 38 for electric equipment device room includes the central inlet port 38A formed on the bottom plate 7A of the revolving frame 7, and the left inlet port 38B disposed in the left under cover 7M. The central inlet port 38A is disposed closer to the rear side than the lateral plate 7G of the revolving frame 7, and is surrounded by the battery attaching frame 7H. Accordingly, the central inlet port 38A opens to the lower side of the battery 19, and the left inlet port 38B opens to the left side to the battery 19.

When the electrical equipment cooling fan 34 is operated, outside air is introduced through the central inlet port 38A and the left inlet port 38B into the battery room 30. This outside air is supplied to the battery 19 as cooling wind, and is also introduced through the communication port 26A of the second partition member 26 into the electrical equipment room 28, and is supplied to the radiator 32.

The frame-side cooling wind inlet port 39 for hydraulic equipment room is disposed in the right under cover 7N of the revolving frame 7 and opens to the hydraulic equipment room 29. The frame-side cooling wind inlet port 39 for hydraulic equipment room includes the front inlet port 39A opening to the lower side of the oil cooler 36, and the rear inlet port 39B opening to the lower side of the hydraulic pump 17. When the hydraulic equipment cooling fan 37 is operated, outside air is introduced through the front inlet port 39A and the rear inlet port 39B into the hydraulic equipment room 29. This outside air is supplied to the hydraulic pump 17 and the oil cooler 36 as cooling wind.

A cover-side cooling wind inlet port 40 for electrical equipment room is disposed in the left rear exterior cover 21 and opens to the battery room 30 (refer to FIG. 2). Accordingly, when the electrical equipment cooling fan 34 is operated, outside air is introduced through the cover-side cooling wind inlet port 40 for electrical equipment room into the battery room 30. This outside air is supplied to the battery 19 as cooling wind, and is also introduced through the communication port 26A of the second partition member 26 into the electrical equipment room 28 and is supplied to the radiator 32.

The cover-side cooling wind inlet port 41 for hydraulic equipment room is disposed on a front surface of the right front under cover 24A configuring the right front exterior cover 24 (refer to FIG. 1). The cover-side cooling wind inlet port 41 for hydraulic equipment room is formed near a corner part, with which the right vertical plate 7C of the revolving frame 7 intersects, of the front surface of the right front under cover 24A and opens to the hydraulic equipment room 29. The cover-side cooling wind inlet port 41 for hydraulic equipment room acts also as a rod insert hole in which a rod of the swing cylinder 6E is inserted. Accordingly, when the hydraulic equipment cooling fan 37 is operated, outside air is introduced through the cover-side cooling wind inlet port 41 for hydraulic equipment room into the hydraulic equipment room 29. This outside air is supplied to the hydraulic pump 17 and the oil cooler 36 as cooling wind.

A plurality (for example, three pieces) of cover-side cooling wind outlet ports 42 for electrical equipment room are arranged in the right rear exterior cover 23 at intervals in the upper-lower direction and open to the electrical equipment room (refer to FIG. 1). The cooling wind introduced into the electrical equipment room 28 from the battery room 30 by the electrical equipment cooling fan 34 is supplied to the radiator 32 and the like, and thereafter, is discharged through the cooling wind outlet ports 42 for electrical equipment room to outside of the upper revolving structure 4.

A cooling wind outlet port 43 for hydraulic equipment room is disposed in the right front under cover 24A of the right front exterior cover 24, and opens to the hydraulic equipment room 29 in a position of facing the hydraulic equipment cooling fan 37. The cooling wind introduced into the hydraulic equipment room 29 by the hydraulic equipment cooling fan 37 is supplied to the oil cooler 36 and the like, and thereafter, is discharged through the cooling wind outlet port 43 for hydraulic equipment room to outside of the upper revolving structure 4.

The power-operated hydraulic excavator 1 according to the embodiment has the configuration as described above, and hereinafter, an explanation will be made of an operation of the power-operated hydraulic excavator 1.

In a case of performing an excavating work and the like using the power-operated hydraulic excavator 1, when an operator sits on the operator's seat 10 and operates the electric motor 15, the hydraulic pump 17 is caused to be driven. When the operator operates the lever/pedal 11 for traveling in this state, the power-operated hydraulic excavator 1 is caused to be traveled to a working site. After the power-operated hydraulic excavator 1 moves to the working site, when the operator operates the control lever 12 for working, the power-operated hydraulic excavator 1 can perform an excavating work of sand and earth or the like by the working mechanism 6 while revolving the upper revolving structure 4.

At the operating of the power-operated hydraulic excavator 1, the electrical equipment cooling fan 34 and the hydraulic equipment cooling fan 37 are driven and rotated at the same time. When the electrical equipment cooling fan 34 is rotated, outside air is introduced through the frame-side cooling wind inlet port 38 for electrical equipment room (the central inlet port 38A formed in the bottom plate 7A and the left inlet port 38B formed in the left under cover 7M) disposed in the revolving frame 7 and the cover-side cooling wind inlet port 40 for electrical equipment room disposed in the left rear exterior cover 21 into the battery room 30. This outside air introduced into the battery room 30 flows around the battery 19 as cooling wind to cool the battery 19. In addition, the second partition member 26 shields heat from the electrical equipment accommodated in the electrical equipment room 28 to the battery 19 accommodated in the battery room 30. As a result, the battery 19 can efficiently be cooled to extend a lifetime of the battery 19.

The cooling wind having cooled the battery 19 in the battery room 30 flows through the communication port 26A of the second partition member 26 into the electrical equipment room 28. The radiator 32 is disposed in the second partition member 26 to cover the communication port 26A. Accordingly, most of the cooling wind flowing into the electrical equipment room 28 can directly be supplied to the radiator 32. The radiator 32 releases the heat of the cooling water circulating in the water jackets in the electric motor 15 and the inverter 16 by the cooling water pump 33 into a large amount of the cooling wind flowing into the electrical equipment room. 28. Thereby, the electric motor 15 and the inverter 16 can be cooled. In this way, the battery 19 accommodated in the battery room 30 and the electrical equipment of the electric motor 15, the inverter 16 and the like accommodated in the electrical equipment room 28 can efficiently be cooled together by the cooling wind caused by the electrical equipment cooling fan 34.

The cooling wind having flowed into the electrical equipment room 28 is supplied to the radiator 32, and thereafter, passes around the electric motor 15, the inverter 16, the cooling water pump 33 and the like. Thereby, the cooling wind cools them from outside. The cooling wind having passed around the electric motor 15, the inverter 16, the cooling water pump 33 and the like is discharged through the cooling wind outlet port 42 for electrical equipment room disposed in the right rear exterior cover 23 to outside of the upper revolving structure 4. Here, the electric motor 15, the inverter 16 and the cooling water pump 33 are arranged within a region not facing (not facing rightly) the electrical equipment cooling fan 34. Thereby, the cooling wind having flowed into the electrical equipment room 28 does not collide directly with the electric motor 15, the inverter 16 and the cooling water pump 33, and flows smoothly toward the cooling wind outlet port 42 for electrical equipment room. As a result, it is possible to prevent the cooling wind warmed by the electric motor 15, the inverter 16 and the like from staying in the electrical equipment room 28 and enhance a cooling efficiency of the electric motor 15, the inverter 16 and the like.

On the other hand, when the hydraulic equipment cooling fan 37 is rotated, outside air (cooling wind) is introduced through the frame-side cooling wind inlet port 39 for hydraulic equipment room (the front inlet port 39A and the rear inlet port 39B formed in the right under cover 7N) disposed in the revolving frame 7 and the cover-side cooling wind inlet port 41 for hydraulic equipment room disposed in the right front under cover 24A of the right front exterior cover 24 into the hydraulic equipment room 29. As shown in FIG. 8, a circulation route of the cooling wind introduced into the hydraulic equipment room 29 is roughly divided into a circulation route F1 of the cooling wind to be supplied to the oil cooler 36 and a circulation route F2 of the cooling wind to flow around the oil tank 18 and the hydraulic pump 17.

The cooling wind flowing in the circulation route F1 passes through the oil cooler 36, and thereafter, is discharged through the cooling wind outlet port 43 for hydraulic equipment room disposed in the right rear exterior cover 23 to outside of the upper revolving structure 4. At this time, the oil cooler 36 releases the heat of the return oil (operating oil), which returns to the oil tank 18 from the hydraulic actuators, into the cooling wind passing through the oil cooler 36. Thereby, it is possible to cool the operating oil which returns to the oil tank 18. The cooling wind flowing in the circulation route F2 flows around the oil tank 18 and the hydraulic pump 17 to cool them, and is discharged through the cooling wind outlet port 43 for hydraulic equipment room from the oil cooler 36 to outside of the upper revolving structure 4. Therefore, it is possible to cool the oil tank 18 and the hydraulic pump 17 from outside.

Here, the oil cooler 36 is disposed to face the outer side surface 18A of the concave recess portion 18B of the oil tank 18 with the gap G therebetween. In addition, the hydraulic equipment cooling fan 37 is attached at the opposite side to the oil tank 18 across the oil cooler 36. As a result, part of the cooling wind flowing in the circulation route F1 flows along the outer side surface 18A of the oil tank 18 and is discharged through the cooling wind outlet port 43 for hydraulic equipment room to outside. Therefore, it is possible to efficiently cool the oil tank 18.

In this way, the power-operated hydraulic excavator 1 according to the present embodiment is provided with: the revolving frame 7 to the front side of which the working mechanism 6 is attached; the operator's seat 10 that is disposed on the revolving frame 7; the electric motor 15 that is disposed on the revolving frame 7 to be separated to one side of the upper revolving structure 4 in the left-right direction from the operator's seat 10 and is operated by the power-feeding from the electric source; the hydraulic pump 17 that is driven by the electric motor 15 to deliver the operating oil to the working mechanism 6; the oil tank 18 that reserves therein the operating oil to be delivered to the working mechanism 6; and the exterior cover 20 that is disposed on the revolving frame 7 to cover the electrical equipment including the electric motor 15 and the inverter 16, as well as the hydraulic equipment including the hydraulic pump 17 and the oil tank 18. The revolving frame 7 is provided with the partition member 25 that partitions the inside of the exterior cover 20 into the electrical equipment room 28 in which the electrical equipment is accommodated and the hydraulic equipment room 29 in which the hydraulic equipment is accommodated. The electrical equipment room 28 is provided therein with the electrical equipment cooling device 31 that includes the electrical equipment cooling fan 34 to cool the electrical equipment. The hydraulic equipment room 29 is provided therein with the hydraulic equipment cooling device 35 that includes the hydraulic equipment cooling fan 37 to cool the hydraulic equipment.

According to this configuration, the electrical equipment accommodated in the electrical equipment room 28 is cooled by the electrical equipment cooling device 31, and the hydraulic equipment accommodated in the hydraulic equipment room 29 is cooled by the hydraulic equipment cooling device 35. Accordingly, even in a case where the use temperature band of the electrical equipment including the electric motor 15 and the inverter 16 is different from the use temperature band of the hydraulic equipment including the hydraulic pump 17 and the oil tank 18, the electrical equipment and the hydraulic equipment can individually be cooled by the electrical equipment cooling device 31 and the hydraulic equipment cooling device 35 that are different from each other. As a result, the electrical equipment including the electric motor 15 and the inverter 16 and the hydraulic equipment including the hydraulic pump 17 and the oil tank 18 each can be used in an appropriate use temperature band to enhance reliability of the power-operated hydraulic excavator 1.

In the embodiment, the revolving frame 7 is provided with the frame-side cooling wind inlet port 38 for electrical equipment room introducing the cooling wind into the electrical equipment room 28 by the electrical equipment cooling fan 34, and the frame-side cooling wind inlet port 39 for hydraulic equipment room introducing the cooling wind into the hydraulic equipment room 29 by the hydraulic equipment cooling fan 37. In addition, the exterior cover 20 is provided with the cover-side cooling wind inlet port 40 for electrical equipment room introducing the cooling wind into the electrical equipment room 28 by the electrical equipment cooling fan 34, the cover-side cooling wind inlet port 41 for hydraulic equipment room introducing the cooling wind into the hydraulic equipment room 29 by the hydraulic equipment cooling fan 37, the cooling wind outlet port 42 for electrical equipment room which discharges the cooling wind introduced into the electrical equipment room 28 to outside, and the cooling wind outlet port 43 for hydraulic equipment room which discharges the cooling wind introduced into the hydraulic equipment room 29 to outside. According to this configuration, a large amount of the cooling wind can be supplied through the frame-side cooling wind inlet port 38 for electrical equipment room and the cover-side cooling wind inlet port 40 for electrical equipment room into the electrical equipment room 28. The electrical equipment can efficiently be cooled. In addition, a large amount of the cooling wind can be supplied through the frame-side cooling wind inlet port 39 for hydraulic equipment room and the cover-side cooling wind inlet port 41 for hydraulic equipment room into the hydraulic equipment room 29. Thereby, the hydraulic equipment can efficiently be cooled.

In the embodiment, the revolving frame 7 is provided thereon with the battery 19 configuring the electric source, which is positioned in back of the operator's seat 10. In addition, the electrical equipment room 28 is formed in back of the partition member 25, the hydraulic equipment room 29 is formed in front of the partition member 25, the battery room 30 in which the battery 19 is accommodated is disposed in back of the partition member 25, and the second partition member 26 is disposed between the battery room 30 and the electrical equipment room 28. According to this configuration, the second partition member 26 shields the heat from the electrical equipment accommodated in the electrical equipment room 28 to the battery 19 accommodated in the battery room 30. As a result, it is possible to efficiently cool the battery 19 and extend a lifetime of the battery 19.

In the embodiment, the second partition member 26 is provided with the communication port 26A that makes communication between the battery room 30 and the electrical equipment room 28, and the cooling wind caused by the electrical equipment cooling fan 34 flows through the communication port 26A into the electrical equipment room 28 from the battery room 30. According to this configuration, the battery 19 accommodated in the battery room 30, and the electrical equipment of the electric motor 15, the inverter 16 and the like accommodated in the electrical equipment room 28 can efficiently be cooled together by the cooling wind caused by the electrical equipment cooling fan 34.

In the embodiment, the electrical equipment room 28 is provided therein with the inverter 16 which controls the drive voltage of the electric motor 15, and the electrical equipment cooling device 31 is configured of the electrical equipment cooling fan 34, the cooling water pump 33 that circulates the cooling water to cool the electrical equipment, and the radiator 32 that releases the heat of the cooling water circulating by the cooling water pump 33 by the cooling wind from the electrical equipment cooling fan 34. In addition, the electric motor 15, the inverter 16 and the cooling water pump 33 are arranged within the region out of the region facing the electrical equipment cooling fan 34 inside of the electrical equipment room 28. According to this configuration, most of the cooling wind having flowed into the electrical equipment room 28 by the electrical equipment cooling fan 34 does not collide directly with the electric motor 15, the inverter 16 and the cooling water pump 33, and flows smoothly toward the cooling wind outlet port 42 for electrical equipment room. As a result, it is possible to prevent the cooling wind warmed by the electric motor 15, the inverter 16 and the like from staying in the electrical equipment room 28 and enhance a cooling efficiency of the electric motor 15, the inverter 16 and the like.

In the embodiment, the hydraulic equipment cooling device 35 is provided with the oil cooler 36 that cools the operating oil returning to the oil tank 18 by supplying the cooling wind by the hydraulic equipment cooling fan 37. The oil cooler 36 is disposed to face the outer side surface 18A of the oil tank 18 with the gap G therebetween. In addition, the hydraulic equipment cooling fan 37 is disposed at the opposite side to the oil tank 18 across the oil cooler 36. According to this configuration, part of the cooling wind introduced into the hydraulic equipment room 29 flows along the outer side surface 18A of the oil tank 18 and is discharged through the cooling wind outlet port 43 for hydraulic equipment room to outside. Therefore, it is possible to efficiently cool the oil tank 18.

It should be noted that the embodiment shows the power-operated hydraulic excavator 1 provided with the canopy 13 covering the upper side of the operator's seat 10, as an example. However, the present invention is not limited thereto, but may be configured to be provided with a cab in place of the canopy 13, the cab accommodating an operator's seat therein.

In addition, the embodiment shows the power-operated hydraulic excavator 1 provided with the revolving frame 7 as the vehicle body frame, as an example. However, the present invention is not limited thereto, but may be configured to be provided with a vehicle body frame that does not perform a revolving operation Further, the embodiment shows the power-operated hydraulic excavator 1 provided with the lower traveling structure 2 of a crawler type, as an example. However, the present invention is not limited thereto, but may be applied to other power-operated construction machines, such as a power-operated hydraulic excavator provided with a lower traveling structure of a wheel type.

DESCRIPTION OF REFERENCE NUMERALS

1: POWER-OPERATED HYDRAULIC EXCAVATOR
2: LOWER TRAVELING STRUCTURE (VEHICLE BODY)
4: UPPER REVOLVING STRUCTURE (VEHICLE BODY)
6: WORKING MECHANISM
7: REVOLVING FRAME (VEHICLE BODY FRAME)
10: OPERATOR'S SEAT
15: ELECTRIC MOTOR (ELECTRICAL EQUIPMENT)
16: INVERTER (ELECTRICAL EQUIPMENT)
17: HYDRAULIC PUMP (HYDRAULIC EQUIPMENT)
18: OIL TANK (HYDRAULIC EQUIPMENT)
18A: OUTER SIDE SURFACE
19: BATTERY (ELECTRIC SOURCE)
20: EXTERIOR COVER
25: PARTITION MEMBER
26: SECOND PARTITION MEMBER
27: DIVIDING WALL
28: ELECTRICAL EQUIPMENT ROOM
29: HYDRAULIC EQUIPMENT ROOM
31: ELECTRICAL EQUIPMENT COOLING DEVICE
32: RADIATOR
33: COOLING WATER PUMP
34: ELECTRICAL EQUIPMENT COOLING FAN
35: HYDRAULIC EQUIPMENT COOLING DEVICE
36: OIL COOLER
37: HYDRAULIC EQUIPMENT COOLING FAN
38: FRAME-SIDE COOLING WIND INLET PORT FOR ELECTRICAL EQUIPMENT ROOM
39: FRAME-SIDE COOLING WIND INLET PORT FOR HYDRAULIC EQUIPMENT ROOM
40: COVER-SIDE COOLING WIND INLET PORT FOR ELECTRICAL EQUIPMENT ROOM
41: COVER-SIDE COOLING WIND INLET PORT FOR HYDRAULIC EQUIPMENT ROOM
42: COOLING WIND OUTLET PORT FOR ELECTRICAL EQUIPMENT ROOM
43: COOLING WIND OUTLET PORT FOR HYDRAULIC EQUIPMENT ROOM
G: GAP

The invention claimed is:
1. A power-operated construction machine comprising:
an automotive vehicle body; and
a working mechanism that is disposed in the vehicle body, wherein the vehicle body includes:
a vehicle body frame to the front side of which the working mechanism is attached;
an operator's seat that is disposed on the vehicle body frame;
an electric motor that is disposed on the vehicle body frame to be separated to one side of the vehicle body in a left-right direction from the operator's seat and is operated by power-feeding from an electric source;
a hydraulic pump that is driven by the electric motor to deliver operating oil to the working mechanism;
an oil tank that reserves therein the operating oil to be delivered to the working mechanism; and
an exterior cover that is disposed on the vehicle body frame to cover electrical equipment including the electric motor and hydraulic equipment including the hydraulic pump and the oil tank, characterized in that:
the vehicle body frame mounts a battery that is positioned in back of the operator's seat and configures the electric source,
the vehicle body frame is provided with:
a first partition member that partitions an inside of the exterior cover into an electrical equipment room in which the electrical equipment is accommodated and a hydraulic equipment room in which the hydraulic equipment is accommodated,
and a second partition member that defines a battery room in which the battery is accommodated and the electrical equipment room;
the electrical equipment room is provided therein with an electrical equipment cooling device that includes an electrical equipment cooling fan to cool the electrical equipment;
the hydraulic equipment room is provided therein with a hydraulic equipment cooling device that includes a hydraulic equipment cooling fan to cool the hydraulic equipment;
the electrical equipment room is formed as a space surrounded by the first partition member, the second partition member and the exterior cover;
the hydraulic equipment room is formed as a space surrounded by the first partition member and the exterior cover, and is formed as a space independent from the electrical equipment room;
the battery room is formed as a space surrounded by the exterior cover and the second partition member, and is formed as a space independent from the electrical equipment room and the hydraulic equipment room, and
the exterior cover is provided with:
a cooling wind outlet port for the electrical equipment room that discharges the cooling wind introduced into the electrical equipment room by the electrical equipment cooling fan from the electrical equipment room to outside of the vehicle body; and
a cooling wind outlet port for the hydraulic equipment room that discharges the cooling wind introduced into the hydraulic equipment room by the hydraulic equipment cooling fan from the hydraulic equipment room to outside of the vehicle body.

2. The power-operated construction machine according to claim 1, wherein
the vehicle body frame is provided with:
a frame-side cooling wind inlet port for electrical equipment room introducing cooling wind into the electrical equipment room by the electrical equipment cooling fan; and
a frame-side cooling wind inlet port for hydraulic equipment room introducing the cooling wind into the hydraulic equipment room by the hydraulic equipment cooling fan, and
the exterior cover is provided with:
a cover-side cooling wind inlet port for electrical equipment room introducing the cooling wind into the electrical equipment room by the electrical equipment cooling fan;
a cover-side cooling wind inlet port for hydraulic equipment room introducing the cooling wind into the hydraulic equipment room by the hydraulic equipment cooling fan;
the cooling wind outlet port for electrical equipment room; and
the cooling wind outlet port for hydraulic equipment room.

3. The power-operated construction machine according to claim 1, wherein
the electrical equipment room is formed in back of the partition member,
the hydraulic equipment room is formed in front of the partition member,
the battery room is disposed in back of the partition member.

4. The power-operated construction machine according to claim 3, wherein
the second partition member is provided with a communication port which makes communication between the electrical equipment room and the battery room, and
cooling wind caused by the electrical equipment cooling fan flows through the communication port into the electrical equipment room from the battery room.

5. The power-operated construction machine according to claim 1, wherein
the electrical equipment room is provided therein with an inverter that controls a drive voltage of the electric motor,
the electrical equipment cooling device is configured comprised of:
the electrical equipment cooling fan;
a cooling water pump that circulates cooling water to cool the electrical equipment; and
a radiator that releases heat of the cooling water circulating by the cooling water pump by the cooling wind from the electrical equipment cooling fan, and
the electric motor, the inverter and the cooling water pump are arranged within a region outside of a region facing the electrical equipment cooling fan inside of the electrical equipment room.

6. The power-operated construction machine according to claim 1, wherein
the hydraulic equipment cooling device is provided with an oil cooler that cools the operating oil returning to the oil tank by supply of the cooling wind caused by the hydraulic equipment cooling fan, the oil cooler being disposed to face an outer side surface of the oil tank with a gap therebetween, and
the hydraulic equipment cooling fan is disposed at the opposite side to the oil tank across the oil cooler.

* * * * *